United States Patent [19]

Taylor et al.

[11] Patent Number: 5,005,661

[45] Date of Patent: Apr. 9, 1991

[54] MOTORCYCLE MOUNTING FOR RADAR

[76] Inventors: Keith Taylor, 118 Bechtel Drive, Kitchener, Ontario, Canada, N2P 1S4; Roger Neal, 113 William Street, Guelph, Ontario, Canada, N1E 5G3

[21] Appl. No.: 313,270

[22] Filed: Feb. 21, 1989

[51] Int. Cl.$^5$ .................................................. G01S 9/44
[52] U.S. Cl. ................... 180/219; 224/30 A; 224/41; 342/104; 343/713
[58] Field of Search ............. 180/219; 280/202, 288.4, 280/304.5; 296/78.1; 224/30 R, 30 A, 41; 343/702, 714, 713, 711; 342/104, 115

[56] References Cited

U.S. PATENT DOCUMENTS

| | | | |
|---|---|---|---|
| 3,948,424 | 4/1976 | Hunn et al. | 224/30 A |
| 4,020,490 | 4/1977 | Millard | 342/115 |
| 4,135,188 | 1/1979 | Bickley, Jr. et al. | 342/104 |
| 4,184,156 | 1/1980 | Petrovsky et al. | 342/104 |
| 4,256,281 | 3/1981 | Harris et al. | 224/30 A |
| 4,293,859 | 10/1981 | Sergent | 342/104 |
| 4,335,382 | 6/1982 | Brown et al. | 342/104 |
| 4,436,350 | 3/1984 | Jolin | 224/41 |
| 4,750,658 | 6/1988 | Jennings | 280/288.4 |
| 4,800,664 | 1/1989 | Marstall | 224/30 A |

*Primary Examiner*—David M. Mitchell
*Attorney, Agent, or Firm*—Gowling, Strathy & Henderson

[57] ABSTRACT

A motorcycle mounting for a radar speed monitor in which the monitor can be readily mounted and removed. The motorcycle mounting includes a first support member with releasable strap for holding a radar monitor in position, second support members extending from each side of the first support member, each being attached at its upper end to the first support member, clamps may be used at the lower end of each second support member for attachment of the lower end of each second support member to the handlebar of a motorcycle; a further support member connected at one end to the first support member and including a pivotable connection at the other end for attachment to a structural member of a motorcycle forward of the handlebar; and a mounting bracket for mounting a radar transmitter/receiver on a motorcycle.

11 Claims, 3 Drawing Sheets

MOTORCYCLE MOUNTING FOR RADAR

BACKGROUND OF THE INVENTION

1. Field of the Invention

This invention relates to the mounting of a radar speed monitor on a motorcycle, and in particular to a mounting on which the monitor can be readily mounted and removed, and also to a motorcycle incorporating a mounting.

2. Description of the Related Art

Radar speed monitors are readily mounted, and used, on motor cars and similar vehicles, but hitherto such monitors have not been usable on motorcycles. It is desirable that the speed monitors be changeable or transferrable between car and motorcycle.

Typical of the prior art is U.S. Pat. No. 4,293,859 which illustrates the use of a radar unit in an automobile; however, there is no art known to the Applicant where a radar unit has been mounted on a motorcycle and yet, for traffic purposes, motorcycle usage by police officers is more desirable in many instances due to greater mobility.

SUMMARY OF THE INVENTION

Accordingly, it would be highly desirable to be able to provide a motorcycle with a radar unit for traffic control and accordingly, with this invention, there is provided in one aspect, a motorcycle mounting for radar comprising: a first support member; releasable means on the first support member for holding a radar monitor in position on the first support member; a second support member extending from each side of the first support member, each second support member being attached at its upper end to the first support member and clamping means at a lower end of each second support member for attachment of the lower end of each second support member to the handlebar of a motorcycle; a further support member connected at one end to the first support member and including means at the other end for attachment to a structural member of the motorcycle forward of the handlebar; and means for mounting a radar transmitter/receiver on the motorcycle.

According to another aspect of this invention, there is provided a method of determining the speed of a moving object such as a vehicle by using a motorcycle comprising providing a motorcycle with a first support member, releasable means on the first support member for holding a radar monitor in position on the first support member; a second support member extending from each side of the first support member, each second support member being attached at its upper end to the first support member and clamping means at a lower end of each second support member for attachment of the lower end of each second support member to the handlebar of a motorcycle; a further support member connected at one end to the first support member and including means at the other end for attachment to a structural member of the motorcycle forward of the handlebar; mounting a radar transmitter/receiver on said last mentioned mounting means; mounting a radar monitor on the first support member on the motorcycle; providing a source of power to actuate the radar transmitter/receiver, and actuating the radar transmitter/receiver to determine the speed of a moving object from the motorcycle while monitoring the speed on the monitor.

This invention provides a support structure for the speed monitor, from which the monitor is detachably mounted. The support structure comprises a tray-like member on which the monitor rests, and to which it is fastened. A support member is mounted at its lower ends on the handle bars of the motorcycle and attached at its upper part to a front area of the tray-like member. A strap extends rearward from the tray-like member to a fairing or other member on the motorcycle. The speed monitor is releasably attached to the tray-like member by, for example, straps. Conveniently, the straps can connect together to hold the monitor in place with opposing lengths of hook and loop material, as sold under the trade mark "VELCRO".

A bracket at one side of the motorcycle holds the radar emitter/receiver, which is connected to the monitor. A locking switch can be positioned on the handle bar, at one side, for locking the display on the monitor.

In its broadest concept, there is provided according to one embodiment of this invention, for a motorcycle mounting for radar, a support member; releasably retaining means on the support member; a strap on each side of the support member attached at the upper ends thereto; clamping means for fastening lower ends of the struts to a motorcycle handle bar and a further strap for connection between the support member and a structural part of the motorcycle forward of the handle bars; means for mounting a transmitter/receiver unit, and for mounting a locking switch for the monitor. In a particularly preferred form, there is provided a support member having releasable fastening means holding a radar monitor in position on the support member; a strap on either side of the support member and attached thereto at the upper ends; clamping means on each side of the motorcycle handle bar for holding the lower ends of the strut; a further strut extending from the support member forward on the motorcycle, being attached at one end to the support member and at the other end to a shield or other member on the motorcycle; mounting means on the motorcycle for mounting a radar transmitter/receiver on the motorcycle. A locking switch for locking the display on the monitor can also be provided.

The various components of the supporting structure of the present invention, as well as the radar monitor and the transmitter/receiver can be made of conventional materials which will be obvious to those skilled in the art upon reading the teachings of the present disclosure. Thus, the various support members can be made of, for example, plastic or tubular steel material, the clamps may be any suitable clamping means, etc.

BRIEF DESCRIPTION OF THE DRAWINGS

The invention will be readily understood by the following description of certain embodiments, by way of example, in conjunction with the accompanying drawings, in which.

DESCRIPTION OF PREFERRED EMBODIMENTS

Figure 1:
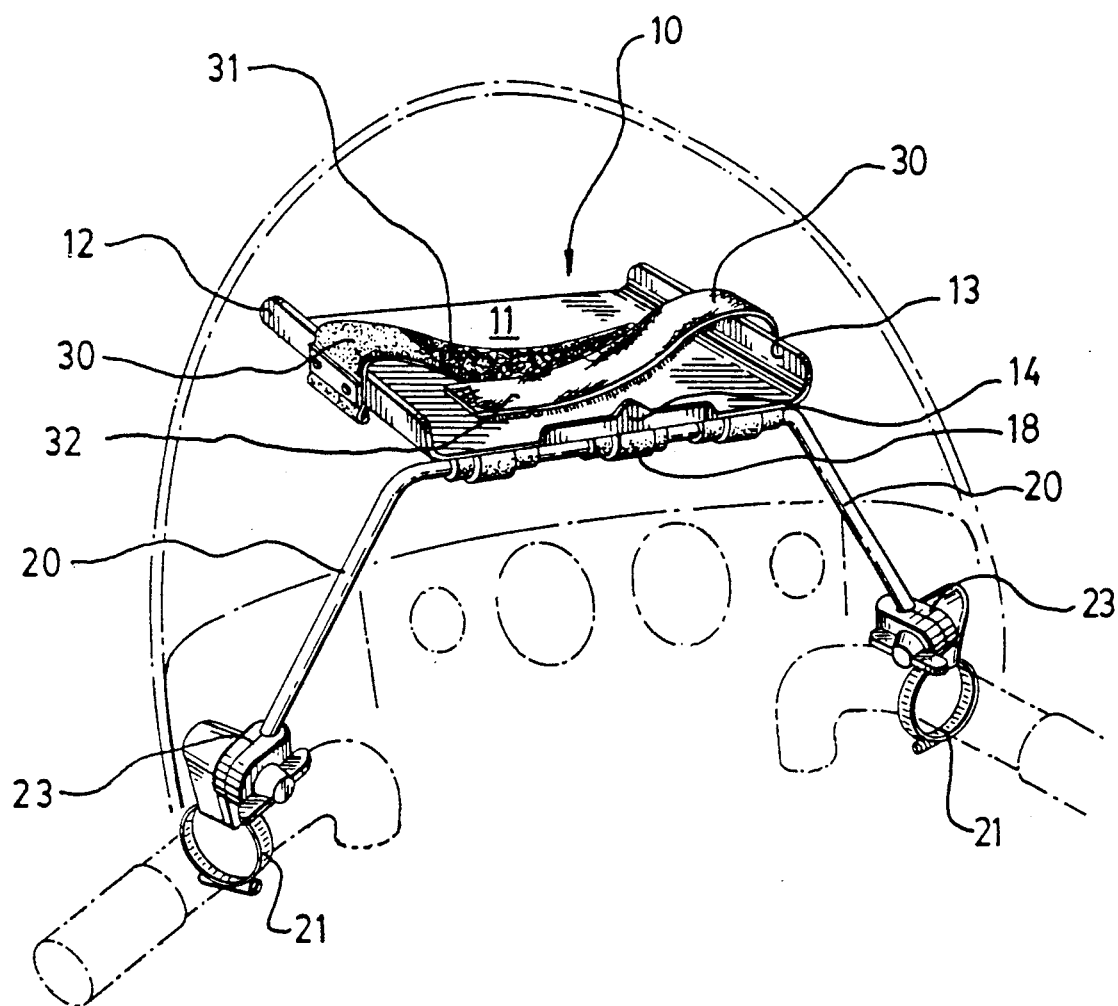
FIG. 1 is a perspective view of a mounting, from above looking slightly downward.
Figure 2:
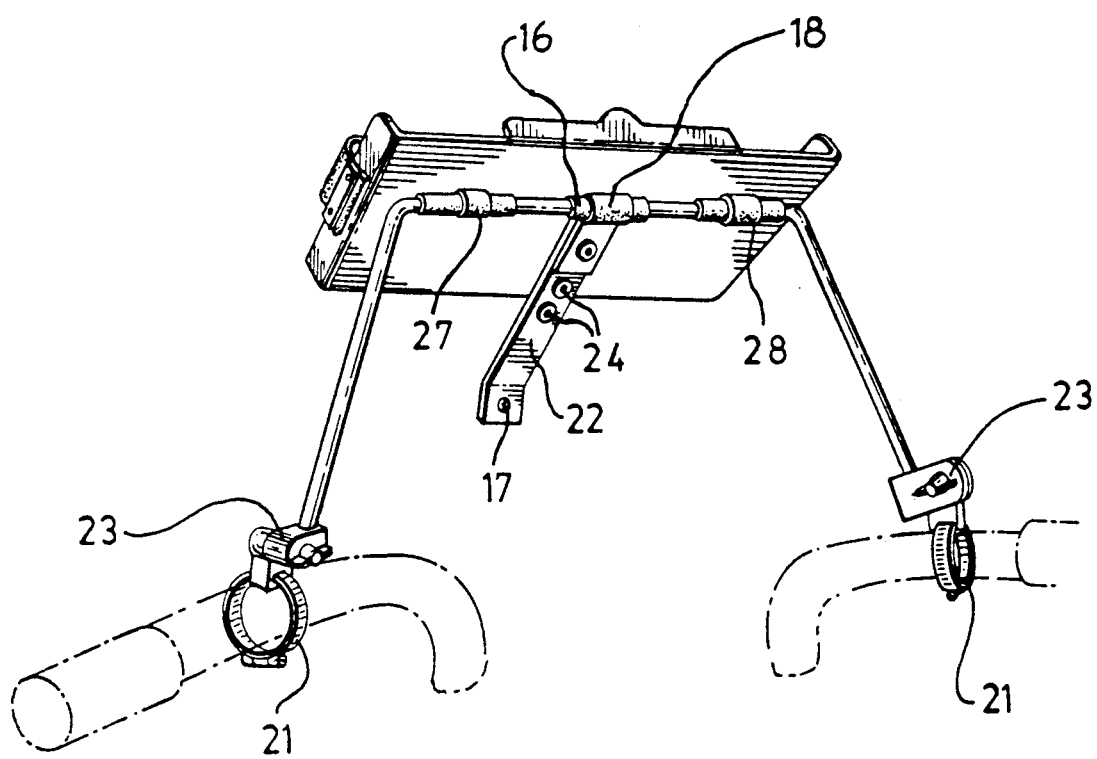
FIG. 2 is a perspective view of the mounting in FIG. 1, from below looking slightly upward.

As illustrated in FIGS. 1 and 2, a mounting comprises a support member 10, which, in the example, is of rectangular tray-like form having a bottom 11, side walls 12 and 13 and a small front wall 14. Support struts 20 support the front of the support member, the struts at their upper ends being joined or unitary in form, and attached to the support member by clamps 21. A further strut 22 extends from under the support member 10, with its free end being adapted to mount the unit against a suitable frame member of the motorcycle—e.g., at the bottom of the windshield. Thus, an aperture 17 may be provided therein for bolting the same to the frame member. This strut 22 is attached to struts 20 and also, as by rivets 24, to the support member, and being adapted to attach to a structural member of the motorcycle at its other end. If desired, a rubber bushing 16 may be provided on the strut 20 centrally thereof for dampening purposes. Also, at the lower ends of the struts 20 are clamps 23 for attachment to the handle bar of a motorcycle.

FIG. 2 illustrates one form of support member; holes (not shown) are provided in the support member for rivets 24 which attach the further strut 22 to the support member, and similarly holes (not shown) are provided for rivets which attach the clamps 21 holding the struts 20 in position.

The drawings illustrate the support struts 20 which, in the form shown, are unitary in form, being of a metal rod bent to the appropriate shape. Rubber or other elastomeric members 27 and 28 are positioned on the central part of the support strut formation, spaced from the end of where the further strut 22 is located. The end 18 of the further strut 22 is bent around and back to form a loop which passes around the support strut formation, and about bushing 16 if desired.

Thus, the support member can be supported vertically by the struts 20 and given forward and backward positioning by the further strut 22. Rubber mountings 27 and 28 can also be provided, in the support number for the monitor, to provide some vibration isolation.

At each side of the support member 10, as seen in FIG. 1 particularly, attached to the sides 12 and 13, are straps 30 for holding a monitor in position on the support member. As an example, these straps can have lengths of hook and loop material 31 and 32 attached thereto. When a monitor is in position on the support member, these lengths of material 31 and 32 are brought over, overlapping and locking together in a known manner.

Figure 3:
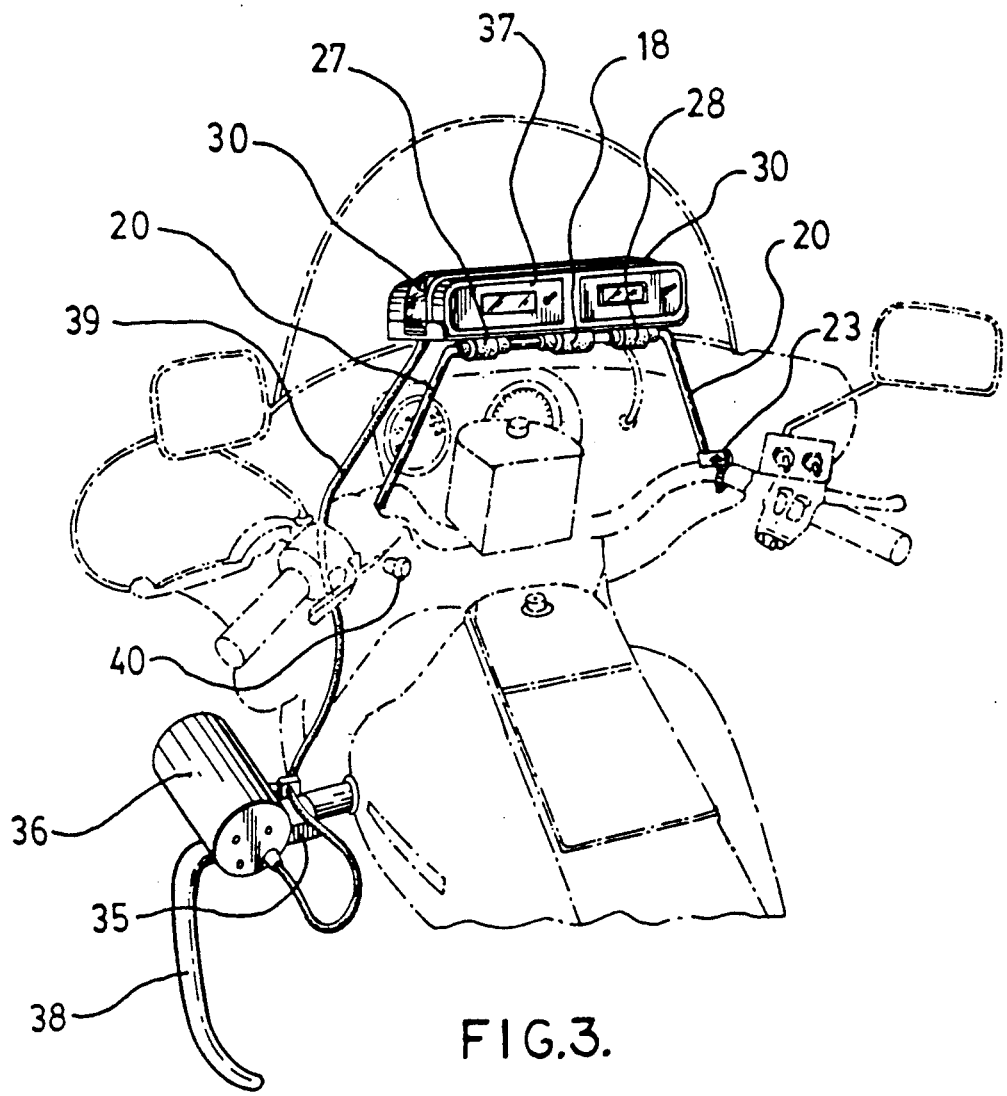
FIG. 3 is a view similar to that of FIG. 1, but mounting a radar monitor in position on a motorcycle.
Figure 4:
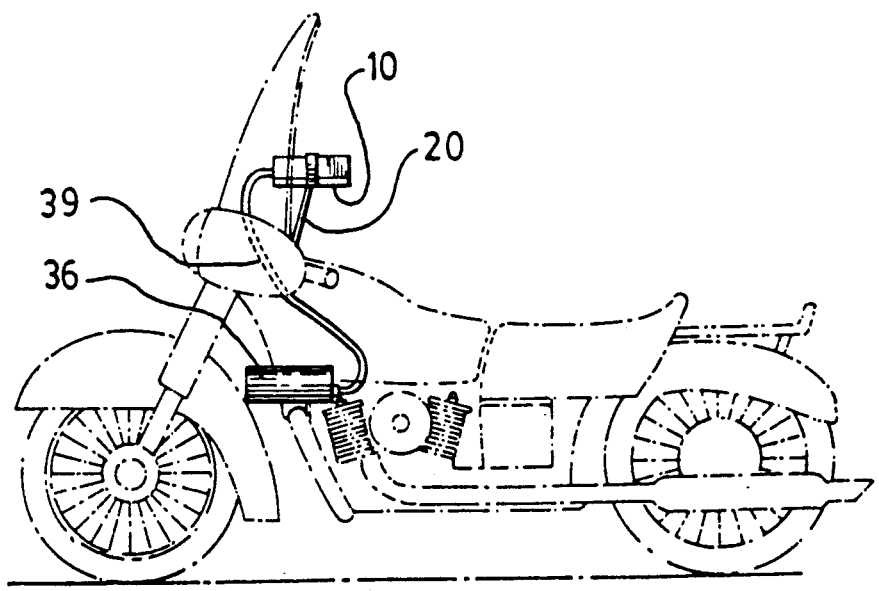
FIG. 4 is a side perspective view of the mounting on a motorcycle.

The support structure or mounting is shown in position on FIG. 3. On one side, for example on the left side, is provided a bracket 35 on which is mounted the radar transmitter/receiver 36, connected to the monitor 37, by a connection lead 39. The bracket is mounted on some convenient member of the motorcycle, for example, a leg protector or roll bar 38 at an appropriate height, e.g., 25".

Mounted on the handle bar of the motorcycle is a locking switch 40. This locks the display on the monitor so that it continues to display a particular reading, after the event has passed, and when the motorcycle is stationary. The switch can be mounted on either side of the motorcycle, but conveniently is on the left side.

The height at which the radar transmitter/reciever is mounted is important, and a particular height is twenty five inches, or 63.5 cm, from the ground to the mounting surface of the bracket. The transmitter reciever can be mounted on either side, the left side being optimum for N. America and elsewhere where vehicles drive on the right hand side of the road. Where vehicles drive on the left hand side, then mounting on the right side could be optimum.

Insted of being imposed, mounted on a bracket, it is possible to provide a fairing within which the transmitter/reciever can be mounted.

The monitor 37, in the example, is one which is also used in patrol cars. It can easily be transferred from car to motorcycle, and back, with the transmitter/receiver 36 and switch 40 being plugged into the monitor and readily disconnected.

The monitor does not interfere with the operation of a motorcycle or cause any inconvenience to the driver. It is easily watched and being standard with car motors, is readily replaced, and is convenient from maintenance and stocking aspects. Both speedometer and monitor readings are easily seen, in conjunction, for evidence purposes.

We claim:

1. A motorcycle including a first mounting for a radar monitor for providing a display, said first mounting comprising a support member positioned above and spaced from the handlebar of the motorcycle, said support member having spaced apart sides; releasable means on said support member for holding a radar monitor in position on said support member; a support strut extending down from each side of said support member, each support strut attached at its upper end to said support member and including clamping means at its lower ends, said clamping means attached to the handle bar of the motorcycle; a further strut connected at a rear end to said support member and attached at its front end to a structural member forward of and moving with the handlebar upon steering; a second lower mounting for mounting a radar transmitter/receiver on the motorcycle, said second mounting including a support member mounted on a main body part of the motorcycle which does not move upon steering of the handlebar at a predetermined height, and connected to said radar monitor; and a lock switch on said handlebar, spaced from said monitor for locking the display on the monitor.

2. The apparatus as claimed in claim 1, wherein said support member is of substantially rectangular form.

3. The apparatus as claimed in claim 1, wherein said releasable means is attached to the sides of said support member.

4. The apparatus as claimed in claim 1, wherein said support member is of substantially rectangular form having a bottom, side walls and back and front walls.

5. The apparatus as claimed in claim 1, wherein said support member is of substantially rectangular form having a bottom, back and sides and wherein said support struts are joined at their upper ends by a transverse center portion.

6. The apparatus as claimed in claim 5, including a support and positioning member attached to said bottom of said support member, said support and positioning member attaching said centre portion to said support member.

7. The apparatus as claimed in claim 5, wherein said further strut includes a looped portion at one end extending around said central portion, said further strut being attached to said bottom of said support member.

8. The apparatus as claimed in claim 3, wherein said releasable means comprises two straps, a strap attached at one end to each side of said support member.

9. The apparatus as claimed in claim 8, wherein each said strap includes a length of hook and loop material, whereby the lengths of hook and loop material overlap over a monitor in position on said support member and retain said monitor in position.

10. The apparatus as claimed in claim 1, including means for mounting said lock switch on the handle bar of a motorcycle for locking the display on a monitor.

11. A method of determining the speed of a moving object such as a vehicle by using a motorcycle comprising: providing a motorcycle with a support member positioned above and spaced from the handlebar of the motorcycle, said support member having spaced apart sides, releasable means on said support member for holding a radar monitor in position on said support member, a support strut extending from each side of said support member, each support strut being attached at its upper end to said support member and clamping means at a lower end of each support strut for attachment of the lower end of each support strut to the handlebar of a motorcycle, a further support strut connected at its rear end to said support member and including means at its front end for attachment to a structural member of the motorcycle forward of said handlebar, and mounting means on said motorcycle for mounting a radar transmitter/receiver at a predetermined height, lower than said support member; mounting a radar transmitter/receiver on said mounting means; mounting a radar monitor on said support member on the motorcycle; providing a source of power to actuate said radar transmitter/receiver; actuating said radar transmitter/receiver to determine the speed of a moving object from the motorcycle while monitoring said speed on a display on said monitor; and locking said display on said monitor.

* * * * *